(12) United States Patent
Chopra et al.

(10) Patent No.: US 9,182,932 B2
(45) Date of Patent: Nov. 10, 2015

(54) SYSTEMS AND METHODS FOR PRINTING CONTENT ASSOCIATED WITH A WEBSITE

(75) Inventors: Ashish Chopra, Singapore (SG); Saurabh Garg, Singapore (SG)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1059 days.

(21) Appl. No.: 12/202,413

(22) Filed: Sep. 1, 2008

(65) Prior Publication Data

US 2009/0119260 A1 May 7, 2009

Related U.S. Application Data

(60) Provisional application No. 60/985,304, filed on Nov. 5, 2007.

(51) Int. Cl.
*G06F 7/00* (2006.01)
*G06F 17/30* (2006.01)
*G06F 3/12* (2006.01)

(52) U.S. Cl.
CPC ............ *G06F 3/1256* (2013.01); *G06F 3/1219* (2013.01); *G06F 3/1254* (2013.01); *G06F 3/1289* (2013.01)

(58) Field of Classification Search
USPC .......................................... 707/999.003, 754
See application file for complete search history.

(56) References Cited

U.S. PATENT DOCUMENTS

| | | | |
|---|---|---|---|
| 6,029,182 A | 2/2000 | Nehab et al. | |
| 6,453,129 B1 | 9/2002 | Simpson et al. | |
| 6,669,085 B1 | 12/2003 | Bergen | |
| 6,744,529 B2 | 6/2004 | Winter et al. | |
| 6,944,868 B2 | 9/2005 | Simpson et al. | |
| 6,975,419 B2 | 12/2005 | Staas et al. | |
| 7,065,497 B1 | 6/2006 | Brewster et al. | |
| 7,184,159 B2 | 2/2007 | Bergstrand | |
| 7,196,803 B1 | 3/2007 | Simpson et al. | |

(Continued)

FOREIGN PATENT DOCUMENTS

| | | |
|---|---|---|
| CN | 101329687 A | 12/2008 |
| CN | 102073728 A | 5/2011 |

(Continued)

OTHER PUBLICATIONS

Luo, P. et al., "Web Article Extraction for Web Printing: a DOM+Visual based Approach," Hewlett-Packard Company, 9th ACM Symposium on Document Engineering, 2009.

(Continued)

*Primary Examiner* — Kimberly Wilson
(74) *Attorney, Agent, or Firm* — Van Cott, Bagley, Cornwall & McCarthy (57) ABSTRACT

Systems and methods for communicating with a network device are provided. In this regard, a representative system, among others, includes a computing device that is electrically coupled to a printing device, the computing device being configured to access a website through a network, the computing device including a print manager in memory, the print manager being configured to: retrieve content associated with the website, receive input data associated with filter criteria, filter the content associated with the website based on the input data associated with the filter criteria, and instruct the printing device to print the filtered content that includes a portion of the retrieved content.

18 Claims, 5 Drawing Sheets

(56) References Cited

U.S. PATENT DOCUMENTS

| | | | |
|---|---|---|---|
| 7,225,401 B2 | 5/2007 | Purvis | |
| 7,249,319 B1 | 7/2007 | Payne et al. | |
| 7,290,285 B2 | 10/2007 | McCurdy et al. | |
| 7,302,423 B2 | 11/2007 | De Bellis | |
| 7,315,391 B2 | 1/2008 | Nakano et al. | |
| 7,386,791 B2 | 6/2008 | Jacobson | |
| 7,444,414 B2 | 10/2008 | Foster et al. | |
| 7,565,350 B2 | 7/2009 | Fetterly et al. | |
| 7,617,446 B2* | 11/2009 | Dutta | 715/234 |
| 7,656,545 B1 | 2/2010 | Simpson et al. | |
| 7,711,747 B2 | 5/2010 | Renders et al. | |
| 7,720,835 B2 | 5/2010 | Ward et al. | |
| 7,769,751 B1 | 8/2010 | Wu et al. | |
| 7,861,165 B2 | 12/2010 | Stevenson | |
| 7,899,915 B2* | 3/2011 | Reisman | 709/228 |
| 7,911,635 B2 | 3/2011 | Kimura | |
| 7,996,000 B1 | 8/2011 | Dubinko et al. | |
| 8,020,090 B2 | 9/2011 | Chen et al. | |
| 8,046,681 B2 | 10/2011 | Vydiswaran et al. | |
| 8,228,527 B2 | 7/2012 | Winter et al. | |
| 8,479,092 B1 | 7/2013 | Pandey | |
| 8,570,572 B2 | 10/2013 | Shustef et al. | |
| 8,570,574 B2 | 10/2013 | Nanaumi | |
| 8,593,666 B2 | 11/2013 | Xiao | |
| 8,645,369 B2 | 2/2014 | Poblete et al. | |
| 8,683,379 B2 | 3/2014 | LuVogt et al. | |
| 8,713,438 B1 | 4/2014 | Broniek et al. | |
| 8,745,091 B2 | 6/2014 | McHenry et al. | |
| 2002/0078045 A1 | 6/2002 | Dutta | |
| 2002/0123988 A1 | 9/2002 | Dean et al. | |
| 2003/0142801 A1 | 7/2003 | Pecht | |
| 2003/0172148 A1* | 9/2003 | Simpson et al. | 709/224 |
| 2003/0210424 A1* | 11/2003 | Sandfort et al. | 358/1.15 |
| 2004/0185882 A1 | 9/2004 | Gecht et al. | |
| 2004/0249934 A1 | 12/2004 | Anderson et al. | |
| 2004/0252332 A1 | 12/2004 | McCoog et al. | |
| 2005/0120311 A1 | 6/2005 | Thrall | |
| 2005/0138065 A1 | 6/2005 | Ciriza | |
| 2005/0154718 A1 | 7/2005 | Payne et al. | |
| 2006/0033950 A1 | 2/2006 | Nakamura | |
| 2006/0048053 A1 | 3/2006 | Sembower et al. | |
| 2006/0123114 A1* | 6/2006 | Aoki et al. | 709/226 |
| 2006/0125820 A1 | 6/2006 | Turcan et al. | |
| 2006/0143286 A1 | 6/2006 | Aoki et al. | |
| 2006/0167862 A1 | 7/2006 | Reisman | |
| 2006/0173985 A1 | 8/2006 | Moore | |
| 2006/0277482 A1 | 12/2006 | Hoffman et al. | |
| 2007/0027932 A1 | 2/2007 | Thibeault | |
| 2007/0047844 A1 | 3/2007 | Watanabe et al. | |
| 2007/0130509 A1 | 6/2007 | Gombert et al. | |
| 2007/0174298 A1 | 7/2007 | Tanimoto | |
| 2007/0182986 A1 | 8/2007 | Ciriza et al. | |
| 2007/0220411 A1 | 9/2007 | Hauser | |
| 2007/0247664 A1 | 10/2007 | Yamamoto | |
| 2007/0288469 A1* | 12/2007 | Shenfield | 707/10 |
| 2008/0005250 A1 | 1/2008 | Oksum | |
| 2008/0005651 A1* | 1/2008 | Grefenstette et al. | 715/500 |
| 2008/0030775 A1 | 2/2008 | Adachi et al. | |
| 2008/0046459 A1 | 2/2008 | Hinohara | |
| 2008/0068650 A1 | 3/2008 | Negoro | |
| 2008/0089709 A1 | 4/2008 | Higashi | |
| 2008/0097828 A1* | 4/2008 | Silverbrook et al. | 705/10 |
| 2008/0147514 A1 | 6/2008 | Shuster et al. | |
| 2008/0307308 A1 | 12/2008 | Sullivan et al. | |
| 2009/0002770 A1* | 1/2009 | Cavill et al. | 358/402 |
| 2009/0013071 A1 | 1/2009 | Matoba et al. | |
| 2009/0030889 A1 | 1/2009 | Chatow et al. | |
| 2009/0119260 A1 | 5/2009 | Chopra et al. | |
| 2009/0171751 A1 | 7/2009 | Zhou et al. | |
| 2009/0310168 A1 | 12/2009 | Kunioka et al. | |
| 2009/0316198 A1 | 12/2009 | Takeuchi et al. | |
| 2010/0030768 A1 | 2/2010 | Poblete et al. | |
| 2010/0058204 A1 | 3/2010 | Wilson | |
| 2010/0069116 A1 | 3/2010 | Silverbrook et al. | |
| 2010/0145955 A1 | 6/2010 | McDonald et al. | |
| 2010/0281351 A1 | 11/2010 | Mohammed | |
| 2010/0302579 A1 | 12/2010 | Nuggehalli et al. | |
| 2010/0328725 A1* | 12/2010 | Gaucas et al. | 358/1.18 |
| 2011/0040823 A1 | 2/2011 | Liu et al. | |
| 2011/0078558 A1 | 3/2011 | Bao et al. | |
| 2011/0085196 A1 | 4/2011 | Liu et al. | |
| 2011/0090535 A1 | 4/2011 | Towata | |
| 2011/0099495 A1 | 4/2011 | Harrington | |
| 2011/0213894 A1 | 9/2011 | Silberstein et al. | |
| 2011/0235085 A1 | 9/2011 | Jazayeri et al. | |
| 2011/0235088 A1 | 9/2011 | Luo | |
| 2012/0011021 A1 | 1/2012 | Wang et al. | |
| 2012/0057193 A1 | 3/2012 | Jazayeri et al. | |
| 2012/0062935 A1 | 3/2012 | Kamath et al. | |
| 2012/0212772 A1 | 8/2012 | Hwang et al. | |
| 2012/0262754 A1 | 10/2012 | Hwang | |
| 2013/0010333 A1 | 1/2013 | Anand et al. | |
| 2013/0097102 A1 | 4/2013 | Revesz | |
| 2013/0103461 A1 | 4/2013 | Bhatia | |
| 2013/0185364 A1 | 7/2013 | Bhatia | |
| 2013/0222843 A1 | 8/2013 | Ganesan et al. | |
| 2014/0036303 A1 | 2/2014 | Vishwanath et al. | |
| 2014/0057238 A1 | 2/2014 | Okamoto et al. | |
| 2014/0122486 A1 | 5/2014 | Simard et al. | |
| 2014/0214632 A1 | 7/2014 | Garera et al. | |

FOREIGN PATENT DOCUMENTS

| | | |
|---|---|---|
| CN | 102253937 A | 11/2011 |
| EP | 0986213 | 5/2000 |
| GB | 2342197 A | 4/2000 |
| WO | WO-2013048428 A1 | 4/2013 |
| WO | WO-2013159246 | 10/2013 |

OTHER PUBLICATIONS

Merrill, S., Read Any RSS Feed on Your Lexmark All-in-one Printer, (Web Page), Jul. 6, 2010, http://techcrunch.com/2010/07/06/read-any-rss-feed-on-your-lexmark-all-in-one-printer/.

Printable Web Pages on the Fly! (Web Page), Mar. 20, 2008, http://vom.printer-friendly.com/2008011945/java/web2printer.html SPCURTIS81, "App Idea—Select Your Own RSS Feed for Scheduled Printing," HP Support Forums, Jul. 26, 2012, <http://h30434.www3.hp.com/t5/ePrint-Print-Apps-Mobile-Printing-and-ePrintCenter/App-Idea-Select-Your-Own-RSS-Feed-For-Scheduled-Printing/td-p/1700391>.

Wikipedia, "Delicious (website)," Jun. 4, 2012, <http://web.archive.org/web/20120604165352/https://en.wikipedia.org/wiki/Delicious_(website)>.

Wikipedia, "Google bookmarks," Mar. 7, 2012, <http://web.archive.org/web/20120307041604/http://en.wikipedia.org/wiki/Google_Bookmarks>.

Written Opinion received in PCT Application No. PCT/CN2012/000569, Feb. 7, 2013, 6 pages.

Chen, Y. et al.; "Improve on Frequent Access Path Algorithm in Web Page Personalized Recommendation Model," (Research Paper), 2011 International Conference on Information Science and Technology (ICIST), Mar. 2011, 4 pages, found at http://ieeexplore.ieee.org/stamp/stamp.jsp?arnurnber=5765216.

International Search Report & Written Opinion received in PCT Application No. PCT/CN2012/000569; Feb. 7, 2013; 6 pages.

Yu, B. et al., "Video Summarization Based on User Log Enhanced Link Analysis," (Research Paper), 11th ACM International Conference on Multimedia, 2003, 2 pages, found at http://dl.acm.org/citation.cfm?id=957013.957095&coll=DL&dl=GUIDE&CFID=89676494&CFTOKEN=29375123.

Formatdynamics, "Print or PDF with CleanPrint," Sep. 29, 2014, found at https://chrome.google.com/webstore/detail/print-or-pdf-with-cleanpr/fklmmmdcofimkjmfjdnobmmgmefbapkf/details?hl=en-US.

Kim, S-M. et al., "Improving Web Page Classification by Label-propagation Over Click Graphs," (Research Paper), Nov. 2-6, 2009, available at http://www.patrickpantel.com/download/papers/2009/cikm09c.pdf.

(56) References Cited

OTHER PUBLICATIONS

Quora, "What are good examples of machine learning enhanced with human intervention in e-commerce?" 2011, found at http://www.quora.com/What-are-good-examples-of-machine-learning-enhanced-with-human-intervention-in-e-commerce.

Tsukada. M. et al., "Automatic Web-Page Classification by Using Machine Learning Methods," Web Intelligence: Research and Development, Springer Berlin Heidelberg, 2001, pp. 303-313, available at http://www.ar.sanken.osaka-u.ac.jp/papers/2006-12/wi01_tsukada.pdf.

Wikipedia, "Amazon Mechanical Turk," Aug. 6, 2008, <http://en.wikipedia.org/wiki/Amazon_Mechanical_Turk>.

Wikipedia, "Machine learning," Aug. 23, 2008, <http://en.wikipedia.org/wiki/Machine_learning>.

\* cited by examiner

SYSTEMS AND METHODS FOR PRINTING CONTENT ASSOCIATED WITH A WEBSITE

CROSS-REFERENCE TO RELATED APPLICATION

This utility Patent Application is based on and claims the benefit of U.S. Provisional Application No. 60/985,304, filed on Nov. 5, 2007, the contents of which are hereby incorporated by reference in their entirety.

TECHNICAL FIELD

The present disclosure relates to computing devices, and more particularly, the disclosure relates to systems and methods for printing content associated with a website.

BACKGROUND

Blogs on the Internet have been becoming more popular. Blogs are websites where users can read commentaries or news written by their peers. Many users print their favorite blogs to read on the go or share with others. Currently, the users actually print the entire blogs or manually preview and select areas on the website that they wish to print. Both situations lead to a waste of time and paper resources.

SUMMARY

Systems and methods for printing content associated with a website are provided. In this regard, a representative system, among others, includes a computing device that is electrically coupled to a printing device, the computing device being configured to access a website through a network, the computing device including a print manager in memory, the print manager being configured to: retrieve content associated with the website, receive input data associated with filter criteria, filter the content associated with the website based on the input data associated with the filter criteria, and instruct the printing device to print the filtered content that includes a portion of the retrieved content.

A representative method, among others, for printing content associated with a website includes accessing a website through a network; retrieving content associated with the website; receiving input data associated with filter criteria, the input data includes blogger names, keywords, or a date range; filtering the content associated with the website based on the input data associated with the filter criteria; and instructing the printing device to print the filtered content that includes a portion of the retrieved content.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the example systems have been described, examples of operation of the systems are provided to explain the manners in which printing content associated with a website, e.g., blogs, can be achieved.

Figure 1:
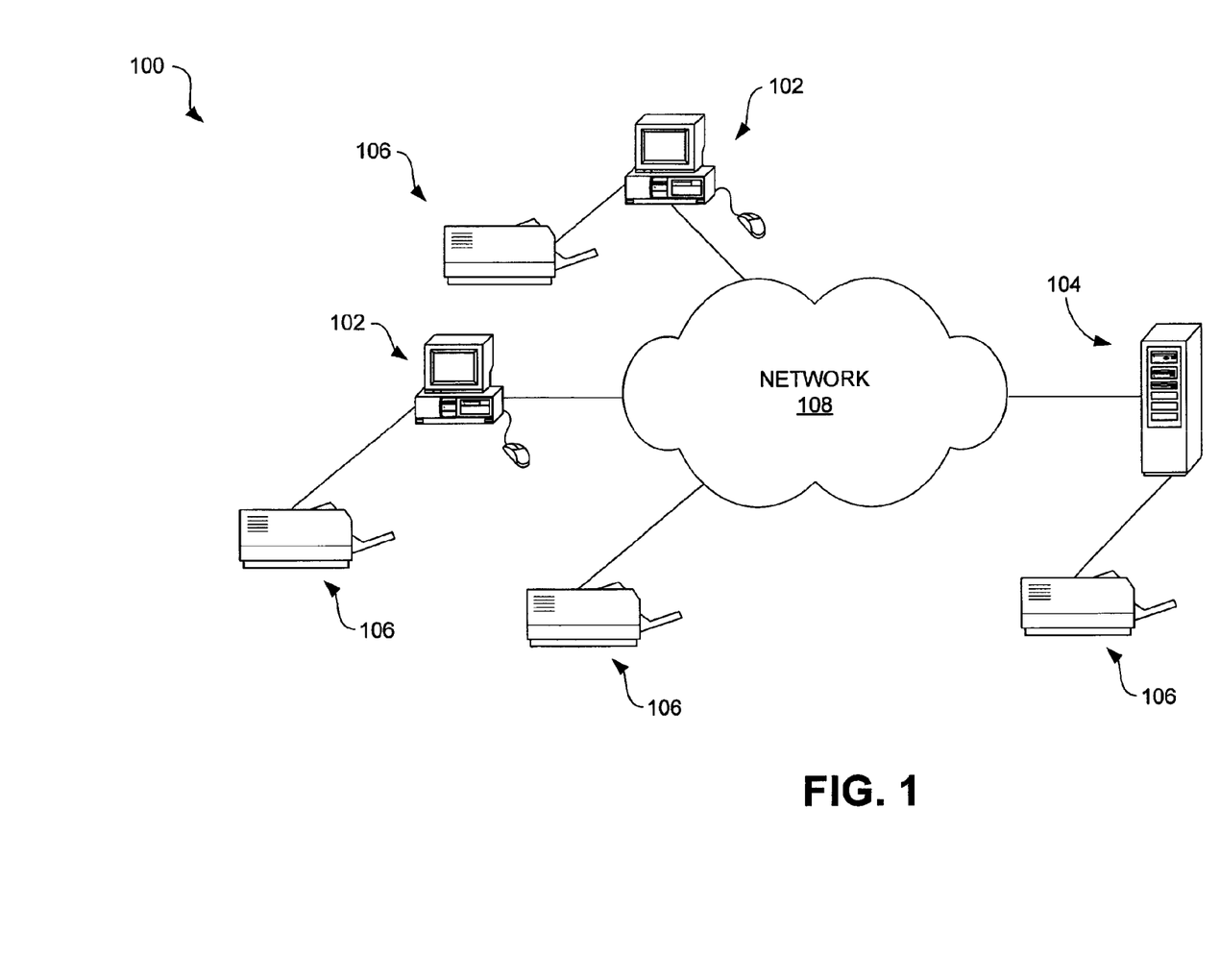
FIG. 1 is a schematic view of an embodiment of a system through which content associated with a website can be printed.

Referring now in more detail to the figures in which like reference numerals identify corresponding parts, FIG. 1 is a schematic view of an embodiment of a system 100 through which content associated with a website can be printed. As indicated in this figure, the system 100 generally comprises one or more user computing devices 102, a central computing device 104, and one or more printing devices 106. The user computing devices 102 can, for instance, include, but are not limited to, laptops, desktop personal computers (PCs) or Macintosh computers, Pocket PC, Mobile Phone. Each of these user computing devices 102 may communicate with a printing device 106 either directly or via a network 108. Similarly, the central computing device 104 may communicate with at least one printing device 106.

By way of example, the printing devices 106 include, but are not limited to, a printer, photocopier, facsimile machine, multifunction printer (MFP), all-in-one device, etc. More generally, however, the printing devices 106 include any device capable of printing the content associated with a website.

As indicated in FIG. 1, the user computing devices 102 can communicate to the central computing device 104 via the network 108. In addition, the central computing device 104 can communicate to the printing device 106 via a network 108 without communicating through a user computing device 102. In this regard, the printing device 106 may, for example, include an embedded Web server 236 (FIG. 2) that supports communication among the user computing device 102, the central computing device 104, and the printing device 106 via the generation of one or more Web pages.

The network 108 may comprise one or more sub-networks that are communicatively coupled to each other. By way of example, these networks include one or more local area networks (LANs) and/or wide area networks (WANs).

Figure 2:
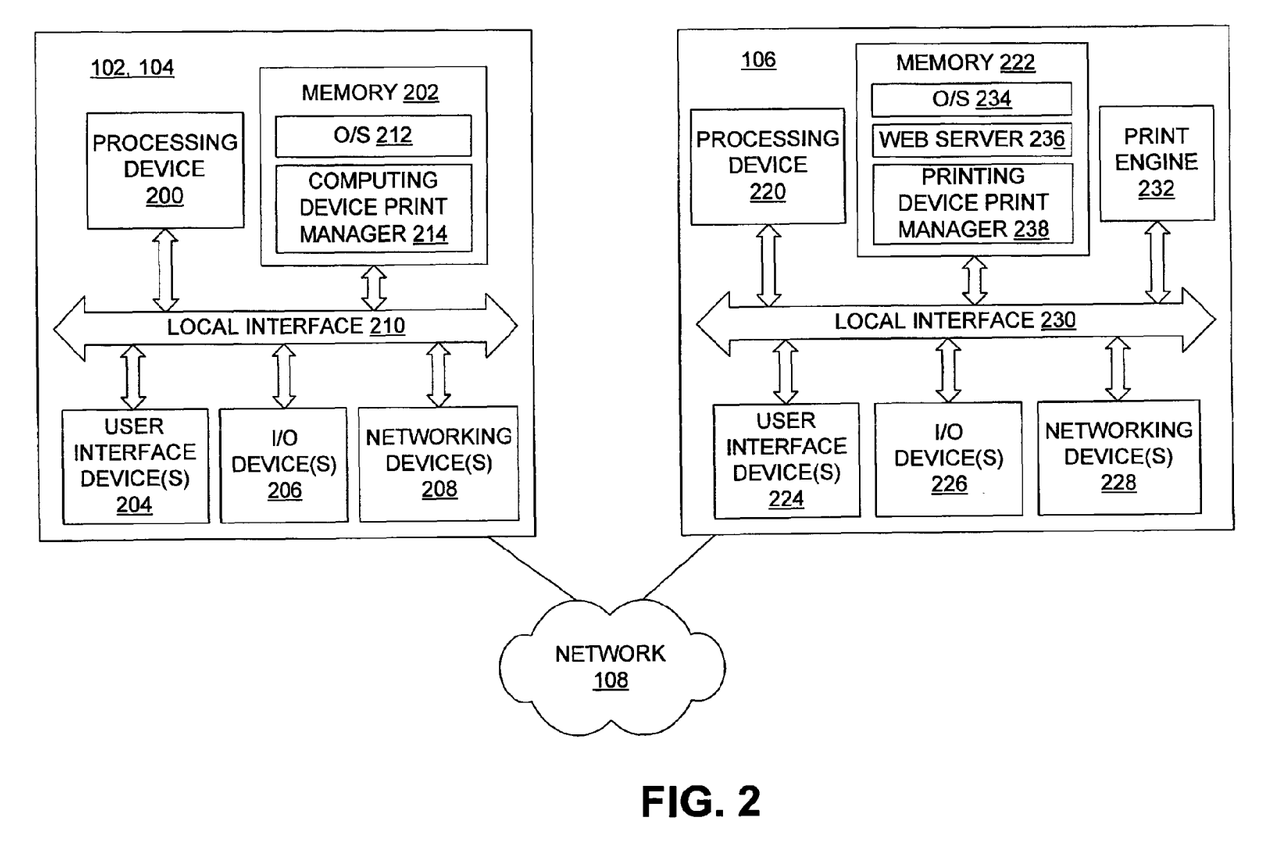
FIG. 2 is a block diagram that illustrates exemplary architectures for a user computing device, a central computing device, and a printing device, such as that shown in FIG. 1.

FIG. 2 is a block diagram that illustrates exemplary architectures for the user computing device 102, the central computing device 104, and the printing device 106, such as that shown in FIG. 1. As indicated in FIG. 2, the user computing device 102 and/or central computing device 104 comprises a processing device 200, memory 202, one or more user interface devices 204, one or more I/O devices 206, and one or more networking devices 208, each of which is connected to a local interface 210. The processing device 200 can include any custom made or commercially available processor, a central processing unit (CPU) or an auxiliary processor among several processors associated with the central computing device 104, a semiconductor based microprocessor (in the form of a microchip), or a macroprocessor. The memory 202 can include any one or a combination of volatile memory elements (e.g., random access memory (RAM, such as DRAM, SRAM, etc.)) and nonvolatile memory elements (e.g., ROM, hard drive, tape, CDROM, Flash Memory, etc.).

The one or more user interface devices 204 comprise those components with which the user (e.g., administrator) can interact with the user computing device 102 and/or central computing device 104. Where the user computing device 102 and/or central computing device 104 comprises a server computer or similar device, these components can comprise those typically used in conjunction with a PC such as a keyboard and mouse.

The one or more I/O devices 206 comprise components used to facilitate connection of the user computing device 102 and/or central computing device 104 to other devices and therefore, for instance, comprise one or more serial, parallel, small system interface (SCSI), universal serial bus (USB), or IEEE 1394 (e.g., Firewire™) connection elements. The networking devices 208 comprise the various components used to transmit and/or receive data over the network 108, where provided. By way of example, the networking devices 208 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 202 normally comprises various programs (in software and/or firmware) including an operating system (O/S) 212 and a computing device print manager 214. The O/S 212 controls the execution of programs, including the computing device print manager 214, and provides scheduling, input-output control, file and data management, memory management, and communication control and related services. The computing device print manager 214 facilitates the process for printing the content associated with a website based on filter criteria and/or print criteria. Operations of the computing device print manager 214 are described in relation to FIG. 3.

The architecture for the printing device 106 is similar to the architecture of the user computing device 102 and/or central computing device 104 and therefore includes a processing device 220, memory 222, user interface devices 224, I/O devices 226, and networking devices 228, each of which has a configuration similar to those described above, and each being connected to a local interface 230.

In addition, however, the printing device 106 includes a print engine 232 that can comprise, for instance, a paper drive mechanism, photosensitive member, optical scanner, developing unit, fusing system, etc. Alternatively, the print engine 232 can comprise an inkjet-based print engine or LaserJet engine. The one or more user interface devices 224 typically comprise the interface tools with which the device settings can be changed and through which the user can communicate commands to the printing device 106. By way of example, the user interface devices 224 comprise one or more function keys and/or buttons with which the operation of the printing device 106 can be controlled, and a display, such as a liquid crystal display (LCD), with which information can be visually communicated to the user which commands may be entered by the user.

The memory 222 includes various programs (in software and/or firmware) including an O/S 234 that contains the various commands used to control the general operation of the printing device 106 and, optionally, an embedded Web server 236. In addition, the memory 222 includes a printing device print manager 238 that facilitates printing content associated with a website based on the filter criteria and/or print criteria. Operations of the printing device print manager 238 are similar to that described in conjunction with operations of the computing device print manager 214 in FIG. 3.

Various programs have been described above. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM or DVD). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Exemplary systems having been described above, system operation will now be discussed. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3:
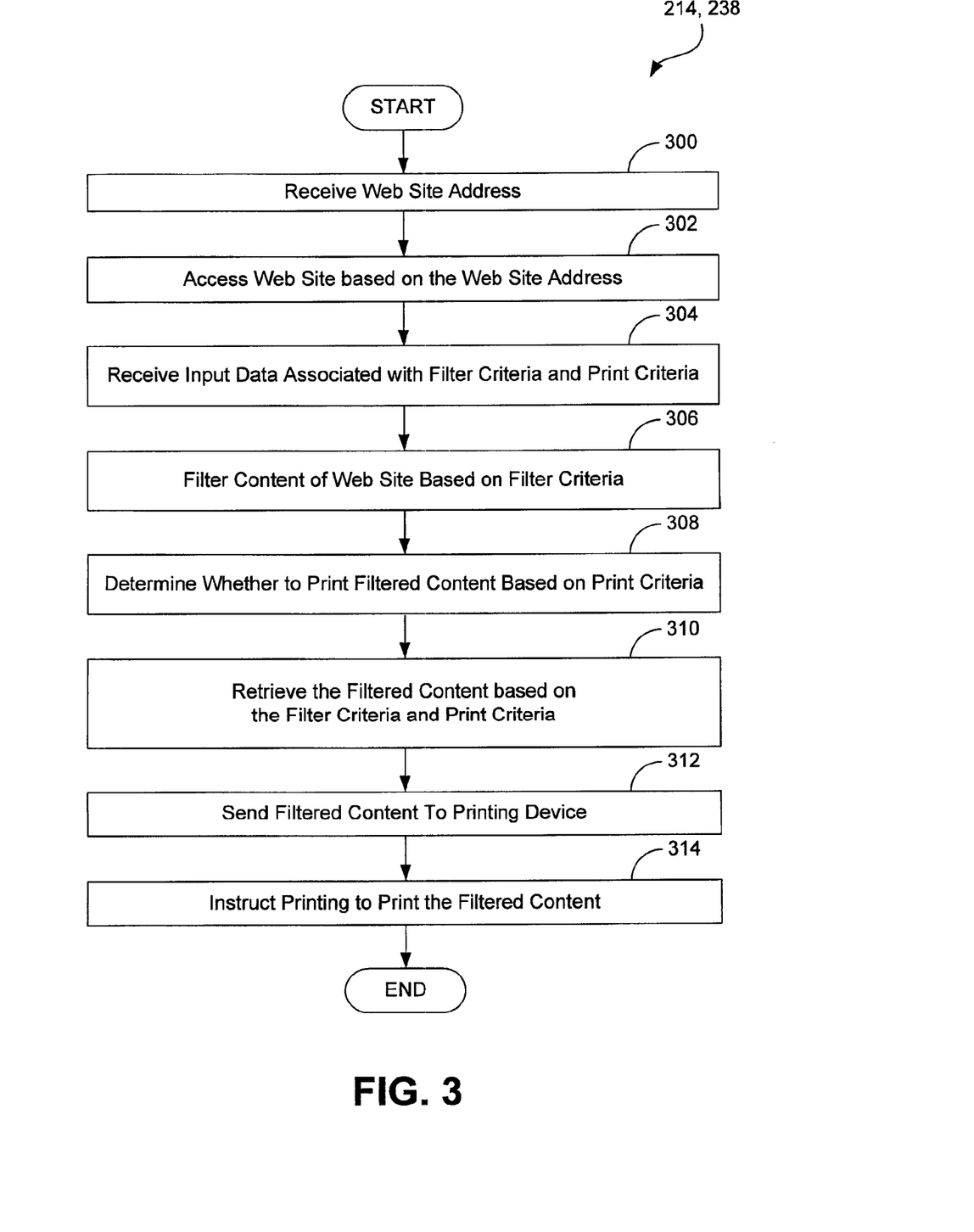
FIG. 3 is a flow diagram that illustrates an embodiment of the architecture, functionality, and/or operation of the system, such as that shown in FIG. 1, through which content associated with a website can be printed.

FIG. 3 is a flow diagram that illustrates an embodiment of the architecture, functionality, and/or operation of the system 100, such as that shown in FIG. 1, through which content associated with a website can be printed. Beginning with steps 300 and 302, a user computing device 102, a central computing device 104, and/or a printing device 106 receives an address of a website and accesses the website based on the website address where the content associated with the website is retrieved, respectively. Alternatively or additionally, the address of the website can be stored in the memory in situations where the website is automatically accessed.

An exemplary website, among others, is a blog, which generally contains entries that are written in chronological order and commonly displayed in reverse chronological order. Many blogs provide commentary or news on a particular subject such as food, politics, or local news; others function as more personal online diaries. A typical blog combines text, images, and links to other blogs, web pages, and other media related to its topic. The blogs are generally configured where readers can leave comments. Most blogs are primarily textual, although some focus on art (art log), photographs (photoblog), sketchblog, videos (vlog), music (MP3 blog), audio (podcasting) or sexual topics (Adult blog), and are part of a wider network of social media.

In step 304, a print manager 214, 238 of the user computing device 102, the central computing device 104, and/or the printing device 106 receives input data associated with filter criteria and/or print criteria. The input data associated with the filter criteria includes keywords or a date range. The keywords include, but are not limited to, a blogger's name, an event name and a company name in stock market blogs, among other words. The filter criteria can be associated with whether to print photo/image associated with blog. The input data associated with the print criteria generally refers to the number of times the content associated with the website is printed in a time period. The number of times in the time period includes, but is not limited to, daily, weekly, monthly and bimonthly, among others. Alternatively or additionally, the print manager 214, 238 can provide a print option on the website that includes input entries for a user to enter the input data associated with the filter criteria.

It should be noted that the print manager 214, 238 can reside in a personal computer in which a user can enter a website and enter a filter criteria and print criteria. Alternatively or additionally, the print manager 214, 238 can reside in a printer that can be controlled by using a user computing device 102. Alternatively or additionally, the print manager 214, 238 can reside in a multi-function printer (MFP) 106 which can be directly connected to the Internet and does not require any additional computing device 102, 104. It should be noted that both the MFP 106 and the print manager 214, 238 that resides in the personal computer can be programmed through a user interface to print the blogs automatically based on stored filter criteria and/or print criteria.

In steps 306 and 308, the print manager 214, 238 filters the content associated with the website based on the filter criteria, and determines whether to print the filtered content based on the print criteria, respectively. The print manager filters the content associated with the website by, for example, decoding tags embedded at the website based on the filter criteria. In step 310, the print manager 214, 238 retrieves the filtered content associated with the website based on the filter criteria and/or print criteria. Alternatively or additionally, responsive to determining that the content associated with the website is to be printed, the print manager 214, 238 can access the website using the address of the website stored in the memory and retrieve the content associated with the website at the time the filtered content associated with the website is to be printed.

In steps 312 and 314, the print manager 214, 238 sends the filtered content to a printing device 106 and instructs the printing device 106 to print the filtered content. Alternatively or additionally, the print manager 214, 238 displays a web page that includes the filtered content before printing the filtered content.

Figure 4:
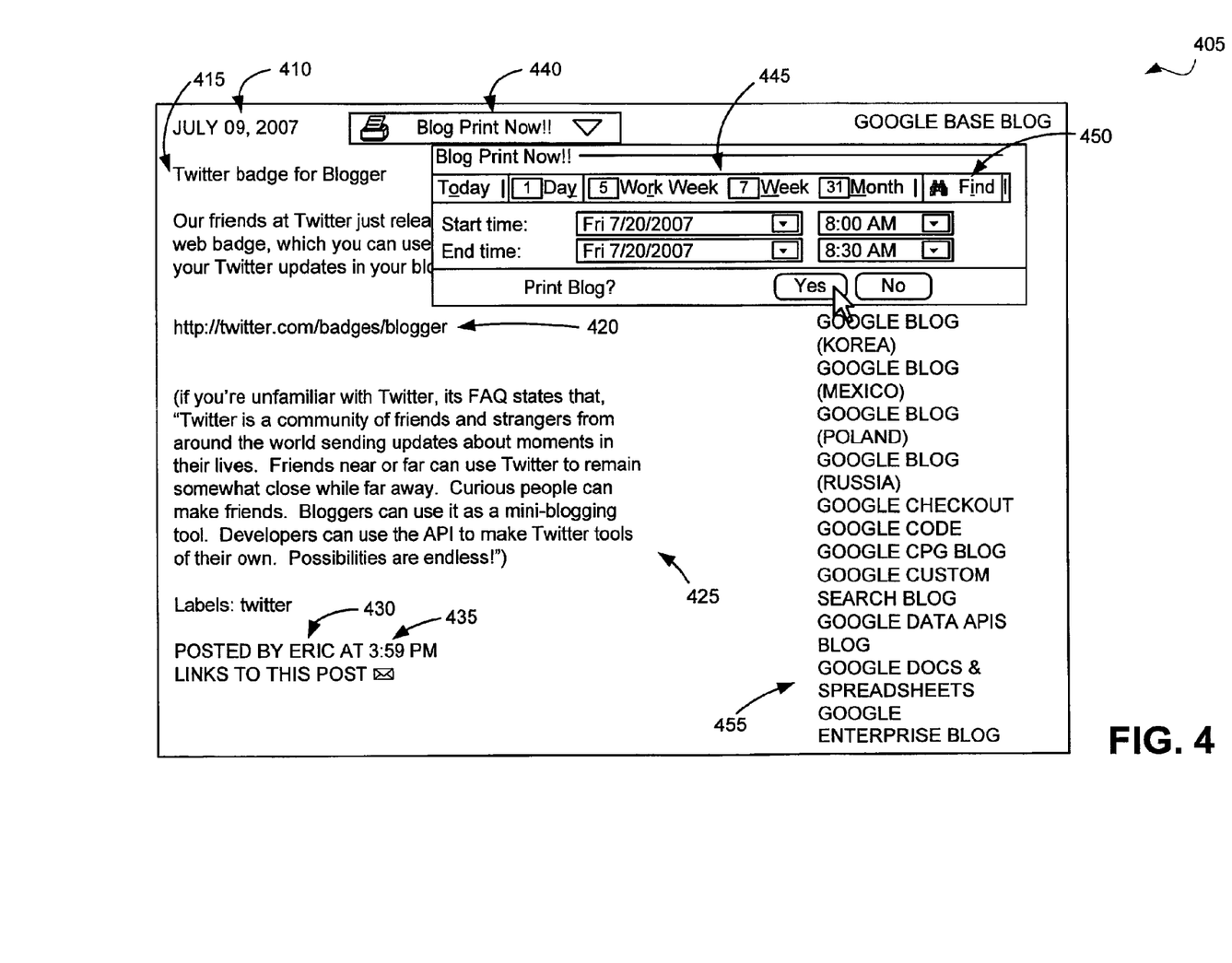
FIG. 4 is an exemplary graphical user interface that illustrates an embodiment of the architecture, functionality, and/or operation of a print manager, such as that shown in FIG. 2, through which content associated with a website can be printed.

FIG. 4 is an exemplary graphical user interface (GUI) 405 that illustrates an embodiment of the architecture, functionality, and/or operation of a print manager 214, 238, such as that shown in FIG. 2, through which content associated with a website can be printed. The GUI 405 includes a date 410 that refers to when the content 425 of the website was posted and a title 415 of the website that identifies the website. The GUI 405 further includes an address 420, content 425, blogger's name 430, time 435 of the day that the content 425 was posted on the website, and advertisements/links 455 to other sites.

The GUI 405 includes a print option 440 that includes input entries for a user to enter input data associated with the filter criteria. The input data includes a date range 445 where the content associated with the website was posted on, for example, that day, previous work week, previous week, previous month, start time, and end time. The time includes the day on a calendar year and the time of day. The print option 440 further includes a find option 450 that facilitates keyword searches such as, but not limited to, blogger's name, event name and company name in stock market blogs, among other words.

Alternatively or additionally, the print manager 214, 238 can print blogs automatically by retrieving the content at the blog's website. For example, the print manager 214, 238 checks for the latest updates and prints them once every week automatically. Alternatively or additionally, the print manager 214, 238 can provide a print option that includes input entries for input data associated with print criteria. The input data associated with the print criteria generally includes print frequency range where the content associated with the website is to be printed on a daily, weekly, monthly or bimonthly basis, among other periodic basis.

Figure 5:
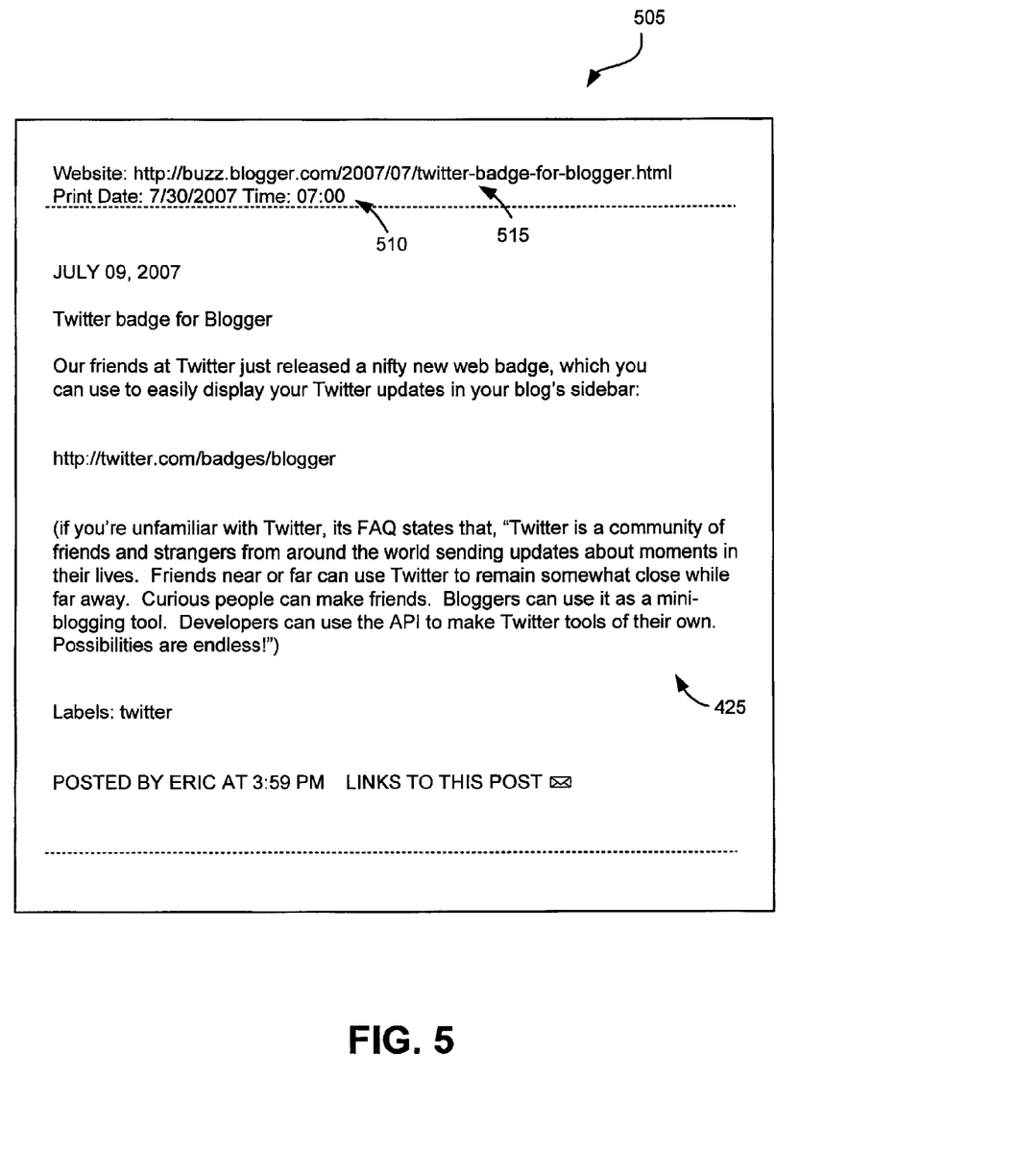
FIG. 5 is an exemplary print out that contains filtered content of a website based on filter criteria and print criteria.

FIG. 5 is an exemplary print output 505 that contains filtered content of a website based on filter criteria and print criteria. The print output 505 includes a print date 510 that refers to when the web page was printed. In this example, the print output 505 was printed on Jul. 30, 2007 at 7:00 AM. The print output 505 further includes the address 515 of the website, e.g., http://buzz.blogger.com/2007/07/twitter-badge-for-blogger.html. The print output 505 includes the content 425 (FIG. 4) of the website based on the filter criteria and print criteria. It should be noted that the print output 505 does not include the other data that did not match the filter criteria and print criteria, such as the advertisement 455 (FIG. 4).

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A printing device for automatically printing content associated with a website accessible through a network, the printing device comprising:

a print engine; and a print manager in memory, the print manager to:

receive and store an address of the website in the memory, access the website using the address of the website stored in the memory in response to determining that the content associated with the website is to be printed, periodically retrieve the content associated with the website at the time the content associated with the website is to be printed in response to accessing the website, receive input data associated with filter criteria, filter the content associated with the website based on the input data associated with the filter criteria, and periodically instruct the print engine to print the filtered content that includes a portion of the retrieved content to facilitate the automatic printing of the content, wherein the period for instructing the print engine to print is based on print criteria, wherein the print criteria includes a frequency with which the content associated with the website is to be printed, wherein the print manager filters the content associated with the website by decoding tags embedded at the website based on the filter criteria, wherein the printing device comprises an embedded web server and a user interface to receive user input regarding the filter criteria and the print criteria.

2. The printing device as defined in claim 1, wherein the input data includes at least one of the following: blogger names, keywords, and a date range.

3. The printing device as defined in claim 1, wherein the frequency includes at least one of daily, weekly, monthly or bimonthly.

4. The printing device as defined in claim 1, wherein the print manager provides a web page that includes the filtered content before printing the filtered content.

5. The printing device as defined in claim 1, wherein the print manager is further configured to provide a print option that includes input entries for a user to enter the input data associated with the filter criteria.

6. The printing device of claim 1, wherein the filtering further comprises removing an advertisement from the content associated with the website.

7. The printing device of claim 1, wherein the website is a blog associated with a stock market and wherein the input data associated with the filter criteria is a company name.

8. The printing device of claim 1, wherein the frequency with which the content associated with the website is to be printed is based on the updating of the content of the website.

9. A method for automatically printing content associated with a website comprising:

storing an address of the website in memory of a printing device;

accessing, by the printing device, the website using the address of the website stored in the memory in response to determining that the content associated with the website is to be printed;

periodically retrieving the content associated with the website at the time filtered content associated with the website is to be printed in response to the accessing;

receiving, by a print manager, input data associated with filter criteria;

filtering, by the print manager, the content associated with the website based on the input data associated with the filter criteria; and periodically providing instructions from the print manager causing the printing device to print the filtered content that includes a portion of the retrieved content to facilitate the automatic printing of the content;

wherein the period for retrieving and the period for instructing the print device to print is based on print criteria, wherein the print criteria includes a frequency with which the content associated with the website is to be printed;

wherein filtering the content associated with the website is achieved by way of decoding tags embedded at the website, wherein the printing device comprises a user interface to receive user input regarding the filter criteria and the print criteria, wherein the print manager displays the website on the user interface and incorporates a print option on the website comprising input options associated with the filter criteria and the print criteria.

10. The method as defined in claim 9, further comprising receiving, by the print manager, the address of the website.

11. The method as defined in claim 9, wherein the frequency includes at least one of daily, weekly, monthly or bimonthly.

12. The method as defined in claim 9, further comprising displaying a web page that includes the filtered content before printing the filtered content.

13. The method as defined in claim 9, further comprising providing a print option at the printing device, that includes input entries for a user to enter the input data associated with the filter criteria.

14. A print manager of a printing device, for printing content associated with a website, the print manager stored on a non-transitory computer-readable medium, the print manager comprising:

logic for storing, by the print manager, an address of the website in memory;

logic for accessing, by the print manager, the website using the address of the website in response to determining, by the print manager, that the content associated with the website is to be printed;

logic for periodically retrieving, by the print manager, the content associated with the website at the time filtered content associated with the website is to be printed in response to the accessing;

logic for receiving, by the print manager, input data associated with filter criteria;

logic for filtering, by the print manager, the content associated with the website based on the input data associated with the filter criteria; and logic for periodically instructing, by the print manager, the printing device to print the filtered content that includes a portion of the retrieved content;

wherein the period for retrieving and the period for instructing the print device to print is based on print criteria, wherein the print criteria includes a frequency with which the content associated with the website is to be printed;

wherein the logic for filtering the content associated with the website is achieved by way of decoding tags embedded at the website, wherein the printing device comprises an embedded web server and a user interface to receive user input regarding the filter criteria and the print criteria.

15. The print manager as defined in claim 14, further comprising logic for receiving, by the print manager, the address of the website.

16. The print manager as defined in claim 14, wherein the frequency includes at least one of daily, weekly, monthly or bimonthly.

17. The print manager as defined in claim 14, further comprising logic for displaying a web page that includes the filtered content before printing the filtered content.

18. The print manager as defined in claim 14, further comprising logic for providing, by the print manager, a print option at the printing device that includes input entries for a user to enter the input data associated with the filter criteria.

* * * * *

UNITED STATES PATENT AND TRADEMARK OFFICE
CERTIFICATE OF CORRECTION

| | | |
|---|---|---|
| PATENT NO. | : 9,182,932 B2 | Page 1 of 1 |
| APPLICATION NO. | : 12/202413 | |
| DATED | : November 10, 2015 | |
| INVENTOR(S) | : Ashish Chopra et al. | |

It is certified that error appears in the above-identified patent and that said Letters Patent is hereby corrected as shown below:

Claims

In column 8, line 42, in Claim 14, delete "print device" and insert -- printing device --, therefor.

Signed and Sealed this
Third Day of May, 2016

Michelle K. Lee
*Director of the United States Patent and Trademark Office*